United States Patent
Jablonsky et al.

[11] 3,918,544
[45] Nov. 11, 1975

[54] MOTOR VEHICLE STEERING GEAR

[75] Inventors: Erich Jablonsky, Bobingen, Rems; Wolfgang Pfundstein, Schwabisch Gmund; Dieter Elser, Bobingen, Rems, all of Germany

[73] Assignee: Zahnradfabrik Friedrichshafen, Friedrichshafen, Germany

[22] Filed: Oct. 22, 1974

[21] Appl. No.: 517,039

[30] Foreign Application Priority Data
Oct. 27, 1973 Germany............................ 2353984

[52] U.S. Cl............................... 180/79.2 R; 91/380
[51] Int. Cl.²........................................... B62D 5/10
[58] Field of Search........ 180/79.2 R; 92/33, 165 R, 92/165 PR; 91/380; 74/388 PS, 498, 499, 500

[56] References Cited
UNITED STATES PATENTS

| | | | |
|---|---|---|---|
| 2,806,450 | 9/1957 | Geyer | 92/33 |
| 3,515,033 | 6/1970 | Geyer | 92/33 |
| 3,518,920 | 7/1970 | Bimba | 91/165 R |
| 3,824,905 | 7/1974 | Jablonsky | 92/165 R |

FOREIGN PATENTS OR APPLICATIONS

| | | | |
|---|---|---|---|
| 434,018 | 4/1948 | Italy | 91/380 |

*Primary Examiner*—Kenneth H. Betts
*Assistant Examiner*—John A. Pekar
*Attorney, Agent, or Firm*—Albert M. Zalkind; Jacob Shuster

[57] ABSTRACT

A vehicle steering gear in which an angle drive interconnects transversely disposed steering wheel shaft and actuator screw spindle. The housing enclosing the screw spindle extends only rearwardly of the vehicle from the gear casing enclosing the angle drive and prevents axial and radial displacement of the screw spindle. Angular twist of the actuator is prevented by means located adjacent the rear end of the housing.

3 Claims, 1 Drawing Figure

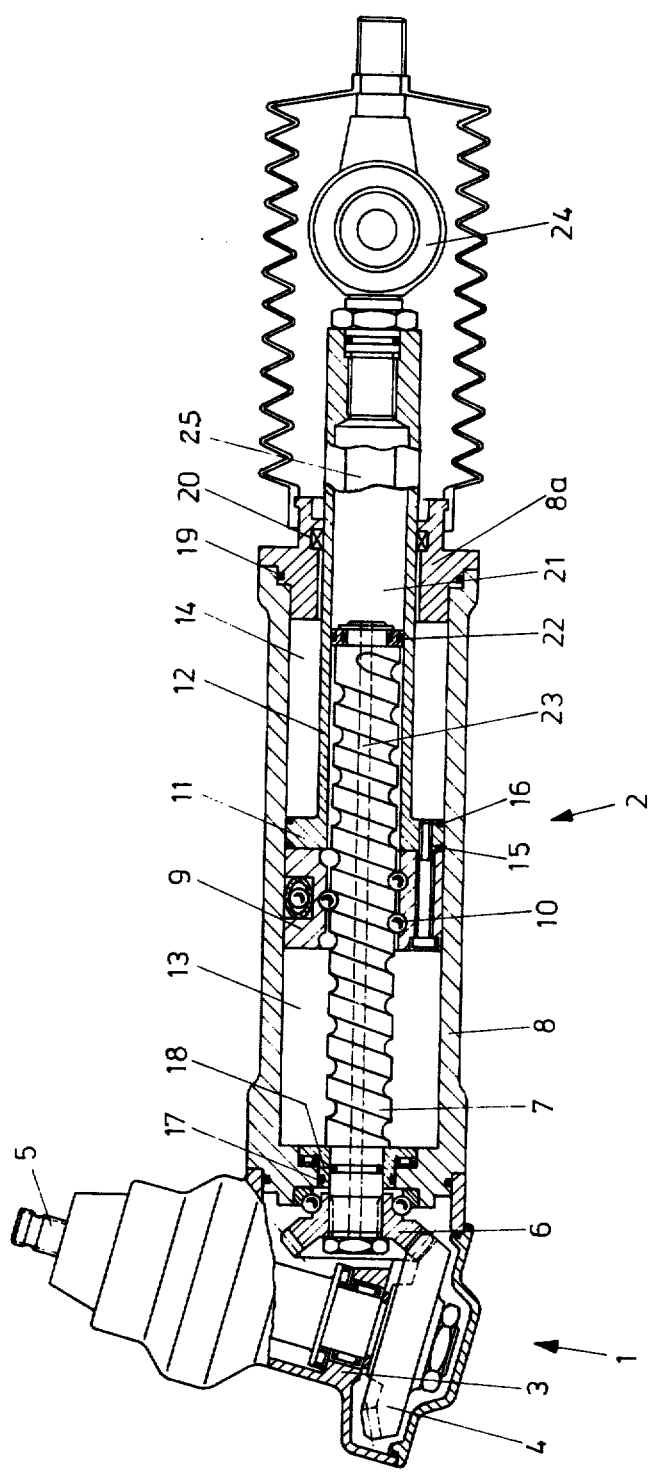

MOTOR VEHICLE STEERING GEAR

This invention relates to a steering gear assembly for motor vehicles of the type wherein the steering shaft is drivingly connected by an angle drive component to a transversely extending steering spindle mechanically coupled to the vehicle wheels.

A steering gear assembly having transverse steering shaft and screw spindle interconnected by bevel gears, is disclosed, for example, in U.S. Pat. No. 3,824,905 to Jablonsky. In this type of steering gear the screw spindle is axially shifted to displace an actuator by rotation of a nut connected to one of the bevel gears. The actuator therefore projects axially from the angle drive or bevel gears in both directions forwardly of the vehicle and rearwardly toward its driven end to which the steering linkage is connected. Accordingly, the housing enclosing the screw spindle extends both forwardly of the angle drive component as well as rearwardly thereof toward the end from which the actuator projects. Because of the foregoing geometrical arrangement, prior steering gears of the type involved were not suitable for installation forwardly of the front vehicle wheels because of the dimensional limitations of such vehicle installations as shown by way of example in U.S. Pat. No. 3,000,458 to Ross.

It is therefore a primary objective of the present invention to provide a mechanical steering gear assembly of the aforementioned type adapted to be installed in a vehicle having limited space forwardly of the steering wheel shaft.

In accordance with the present invention the screw spindle of the steering gear assembly is prevented from being axially and radially displaced relative to a cylindrical housing that extends rearwardly only from the angle drive gear casing from which the steering wheel shaft extends upwardly. The actuator to which the screw spindle is connected is prevented from being angularly twisted by means located adjacent the rear end of the housing. Fluid power assist facilities are also provided for including fluid pressure compensation.

The drawing is a side elevation mostly shown in longitudinal section through a steering gear assembly constructed in accordance with the present invention.

Referring now to the drawing in detail, the steering device of the present invention includes an angle drive component 1 located adjacent the forward end of a vehicle, and a horizontally elongated, screw-and-nut drive assembly 2 extending rearwardly from the angle drive component. The angle drive component 1 includes a gear casing or housing 3 extending upwardly at a rearward incline and rotatably mounts a driving bevel gear 4 adjacent its lower end. The bevel gear 4 is connected to a steering shaft 5 located transversely of the spindle 7 and is manually rotated through the vehicle steering wheel (not shown). A driven bevel gear 6 in the angle drive component is enmeshed with bevel gear 4 and is connected to the forward end of a threaded screw spindle 7.

The spindle 7 is rotatably mounted in a cylindrical housing 8 of the screw-and-nut drive assembly 2 and is held against any axial or radial displacement. An axially shiftable drive nut 9 is rotatably mounted on the spindle 7 and is in operative drive engagement therewith through bearing balls 10. The drive nut is connected to a piston 11 from which an elongated tubular actuator 12 extends rearwardly. The actuator 12 is slidably mounted by an end cap 8a fixed to the rear end of housing 8 and is prevented from being angularly displaced by any suitable means, as for example, by an external surface 25 of polygonal cross-section matched by the cross-section of the internal guide surface of the opening in cap 8a.

In the illustrated embodiment of the invention, a fluid power assist arrangement is shown wherein the piston 11 internally divides the housing 8 into two opposed pressure chambers 13 and 14 sealed from each other by the sealing elements 15 and 16 on the piston 11. Sealing elements 17 and 18 seal the forward end of chamber 13 from the space enclosed by the housing 3 connected to the forward end of housing 8. The rear end of chamber 14 is sealed by sealing elements 19 and 20 carried by the cap 8a.

The actuator 12 encloses an oil chamber 21 at the rear axial end of spindle 7. A sealing element mounted on the rear end of spindle 7 seals the oil chamber 21 from pressure chamber 13. A compensating bore 23 extends through the spindle 7 to establish fluid communication between the oil chamber 21 and the reduced pressure space enclosed by the housing 3 of the angle drive component. Thus, forces exerted on the opposed pressure faces of the piston 11 exposed to the pressure chambers 13 and 14, are substantially equalized. Fluid under pressure is selectively supplied to either chamber 13 or 14 under control of a suitable distributor control valve (not shown) enclosed, for example, in the upper portion of housing 3. Such control valves are well known to those skilled in the art, as disclosed for example in U.S. Pat. No. 3,651,885 to Lang.

The actuator 12 is connected to the vehicle steering linkage (not shown) in a well known manner by a universal joint 24 at the rear free end of the actuator.

Thus, a steering device involving a direct mechanical drive connection to the steering linkage and wheels of a vehicle has been described, wherein rotational movement of the steering spindle 5 by the driver is converted into axial thrust of the screw spindle 7 and the drive nut 9 mechanically connected to the steering linkage to cause steering movement of the vehicle wheels. The drive arrangement is such that it is particularly suitable for a steering control installation located forwardly of the steered wheels in the vehicle by having a minimum dimensional extension forwardly of the steering wheel shaft.

We claim:

1. A steering gear assembly adapted for motor vehicles or the like, comprising a steering shaft (5), a screw spindle (7) disposed transversely of the steering shaft, intermeshing bevel gears (4 and 6) respectively connected to the steering shaft and the screw spindle, a gear casing (3) enclosing the bevel gears and rotatably supporting the steering shaft, an elongated housing (8) connected to the gear casing and enclosing the screw spindle, means for rotatably supporting the screw spindle within the housing while preventing axial and radial displacement thereof, a steering nut (9) drivingly engaged with the screw spindle and axially displaceable within the housing, a piston (11) fixedly connected to the nut, a tubular actuator (12) connected to the piston and axially displaceable therewith relative to the housing, means (25) for preventing angular displacement of the actuator relative to the housing, a fluid chamber (21) enclosed within the actuator, means (22) mounted on the screw spindle for sealing said fluid chamber in axially spaced relation to the gear casing, and pressure compensating means (23) for establishing fluid communication between the chamber and the gear casing through the screw spindle.

2. The combination of claim 1 wherein said means preventing angular displacement of the actuator includes a cross-sectionally polygonal external profile (25) on the actuator and means (8a) located adjacent an axial end of the housing opposite the gear casing in slide bearing relation to said profile of the actuator.

3. The combination of claim 2 wherein said housing extends rearwardly only from the gear casing relative to the motor vehicle.

* * * * *